Figure 1:
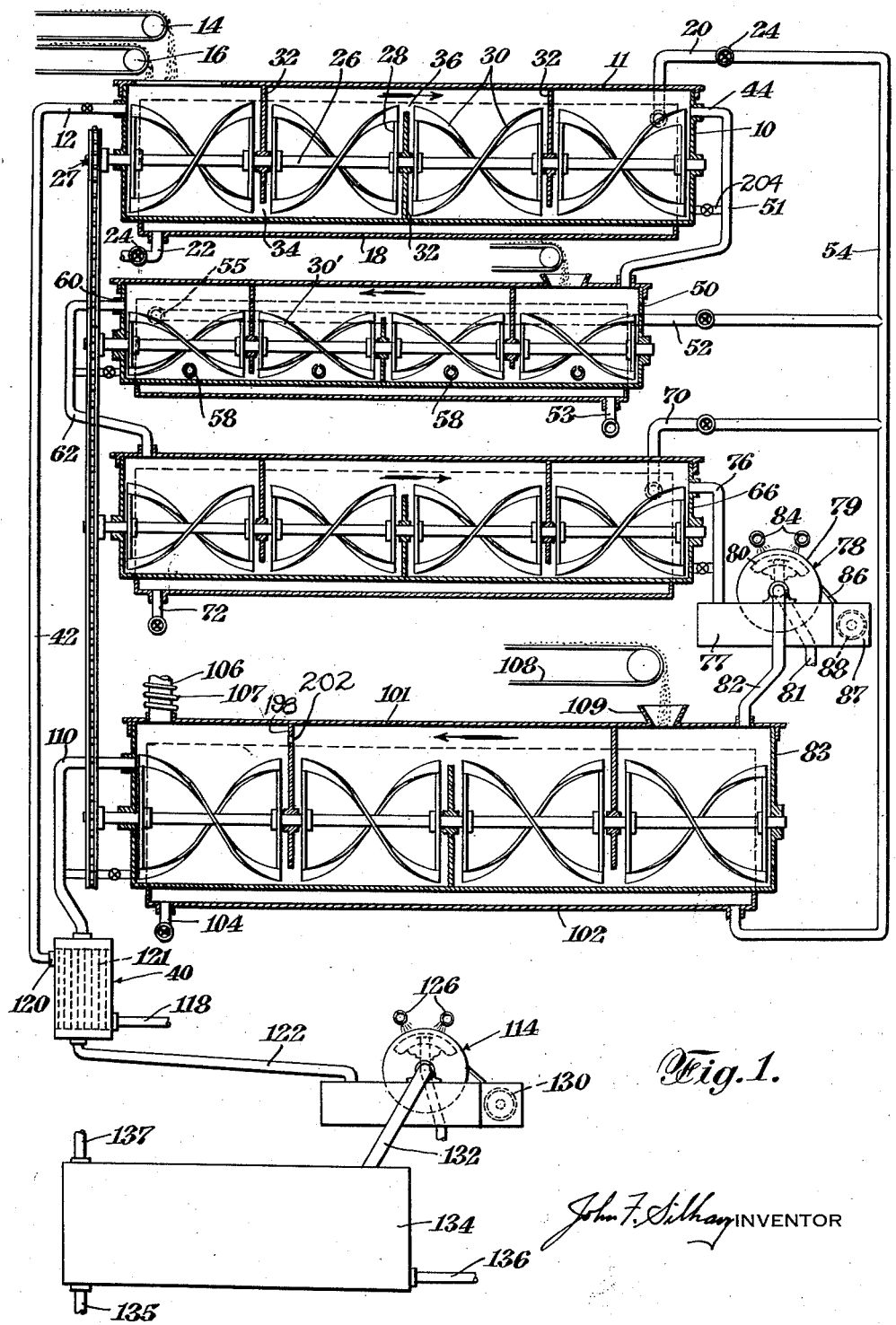

Patented Aug. 23, 1938

2,127,759

UNITED STATES PATENT OFFICE 2,127,759

METHOD OF AND APPARATUS FOR PRODUCING WORT OR THE LIKE

John F. Silhavy, Saginaw, Mich.

Application June 5, 1934, Serial No. 729,092

11 Claims. (Cl. 99—52)

This invention relates to a method of and apparatus for the production or wort or similar liquid mixtures.

The manufacture of malt beverages, at least to the point of fermenting the wort, is today essentially a batch process. The charge of cereals (malt, rice, and corn flakes or the like) and water are mashed at proper temperatures, the solution is then drained, then boiled with hops, then drained and cooled. When large batches are made, time must be allowed for intimate mixing, and also for the desired temperature changes to take place during the various steps. Considerable time is also required for draining, sparging, and for boiling the batch after the hops have been added. It can easily be seen, that in the batch process all grains of malt and cereal particles cannot possibly receive identical treatment in the mash tun or tub; neither can the last portions of wort added to the kettle receive the same treatment as portions added at the start. This difference in treatment varies in direct proportion to the size of the batch.

The following is a general outline of the mashing and brewing operations as used today:

Water, usually warm, malt, and other cereals in proper proportions are charged into the mash tun with large mixing arms in motion. The temperature of the batch is usually raised to 100 to 125 degrees F. by means of live steam or a steam coil. At this temperature the enzyme peptase is most active in modifying the insoluble albuminoids into a soluble form. A definite time is allowed at this time for this change to occur. The temperature is then raised to around 154 degrees F. where the diastase of the malt inverts the starch into maltose and dextrin. After allowing time for this change to take place, the temperature is raised to about 165 to 170° F., the final mashing temperature. Above 170° F. the diastase becomes very weak and substantially inactive. The iodine test is used to make sure that all starch has been inverted. The stirrers or mixing arms are then stopped and a rest period of about one-half hour follows. The above steps require about two and one-half hours.

During the rest period the grains of malt slowly settle and rest on the false bottom of mash tub (the false bottom consists of finely perforated metal) and in so doing form a filtering pad of husks through which the main body of liquid passes on its way to the grant (observation station) and then to the brew kettle. By carefully observing the wort at the grant, the operator knows when it is clear enough to pass it into the brew kettle; the early turbid wort is pumped back into the mash tun. The rate of flow must be carefully regulated in order to get as clear wort as possible; too rapid a flow will result in clogging up the perforations. When the rate of flow decreases, the mash is sparged (sprinkled with hot water) to wash out the wort adhering to the husks, the stirrers remaining stationary in order not to disturb the existing filtering pad, which, of course, results in inefficient washing. This draining and sparging and further draining may require three to four hours.

After the wort reaches the brew kettle, hops are added, either all at once or in definite portions. The batch is brought to a boil by means of a steam coil. After all the hops have been added, the solution is boiled for about an hour; the hops coagulate undesirable ablumens, which helps to clarify the wort. After boiling ceases, the hops quickly settle to the false bottom of this kettle, or else the mixture is allowed to flow into a hop-jack with a false bottom. In either case, the hops resting on the false bottom act as a filtering medium in clarifying the wort.

The wort then goes to the cooler, where it is cooled and is then ready for the addition of yeast in the fermenting casks. Cooling may require two or three hours, depending on the size and efficiency of the cooler.

The total time required by the batch process to produce a cooled wort is about ten to twelve hours.

The object of my invention is to overcome the objections and defects of the batch processes now in use. I have invented a continuous process for the production of cooled wort. My invention includes the steps of mixing the necessary cereals with water at the proper temperature while continuously progressing the mixture through a mixing section, then mixing and heating at a higher temperature in another section while advancing the material continuously, and then heating it to a higher temperature and moving it along continuously in another section. After this mashing treatment the cereals are continuously removed by filtration with a suction filter or similar device. The cereals on the suction cylinder are sparged with hot water to wash out desirable water soluble constituents. The liquid (filtrate) is then conducted to a section where hops are added. The mixture is stirred or agitated and advanced through a heated section. This agitating may be obtained merely by a vigorous boiling. The mixture with the hops is pre-cooled and then filtered by passing it over a continuous suction filter or the like and the hops on the suction roll sprayed or sparged. In another form of my invention, I filter the hops from the liquid without precooling and pass this hot liquid through the jackets of the mash mixers or mixing sections to heat the liquid in the mixers. The liquid is then passed through a final cooler and from here the wort is run into the fermenters. As each fermenter is filled, yeast may be added. In the more detailed description hereinafter given, I will describe the various steps and also improvements of the steps. Instead of using separate mixing sections or mash mixers, in some instances I prefer to combine the first two mash mixers in one unit. Or I may combine the last two mash mixers in one unit or I may combine all three mash mixers in one large unit and still maintain the desired temperatures in the sections within allowable limits. I have found that by adding carbon dioxide gas or carbonic acid gas to the mash, the diastatic action of the malt as well as the peptonization of the albuminoids is increased.

By using my continuous process there is a saving of time because it is not necessary to wait for large bodies of liquid to be heated. Also there is ease of control due to processing a relatively small quantity of material continuously rather than a much larger quantity in the batch manner. The method is flexible to meet the requirements of individual operators. The resulting wort is more uniform on account of the continuity of the process. There is also a larger output per unit of floor space since all apparatus is in continuous use in contrast to present practise, where the greater part of the equipment is idle and only a small portion of the equipment is in operation at one time. Due to the improved mixing and to the more thorough washing or sparging of the spent cereals and grains, a better yield from a given weight of cereals is obtained. A large economy is effected by utilizing the boiled wort as a heating medium in the earlier stages of the process. This is made possible by the continuity of the process. Since my continuous process requires only a relatively small amount of water for washing out adhering wort from the grains on the filter, it is possible to work with a much thinner mixture in the mash mixers than is done at present in the mash tun. By using a more liquid or thinner mixture a much better extraction yield on the grains is obtained. Also with a thinner mash, the rate of diastatic activity is higher than with a thicker mash. A more uniform product at a lower cost is obtained as a result of using my invention. One feature of my invention is the continuity of the process. Another feature of my invention is the arrangement of the apparatus. Still another feature of my invention is the continuous filter means provided. Still another feature is the economizing in heat which is provided for by the arrangement of the apparatus. Other features and objects will be in part obvious and are in part above pointed out and will be pointed out hereinafter. Various changes may be made in practice within the scope of my invention without digressing from the spirit of my invention.

Figure 2:
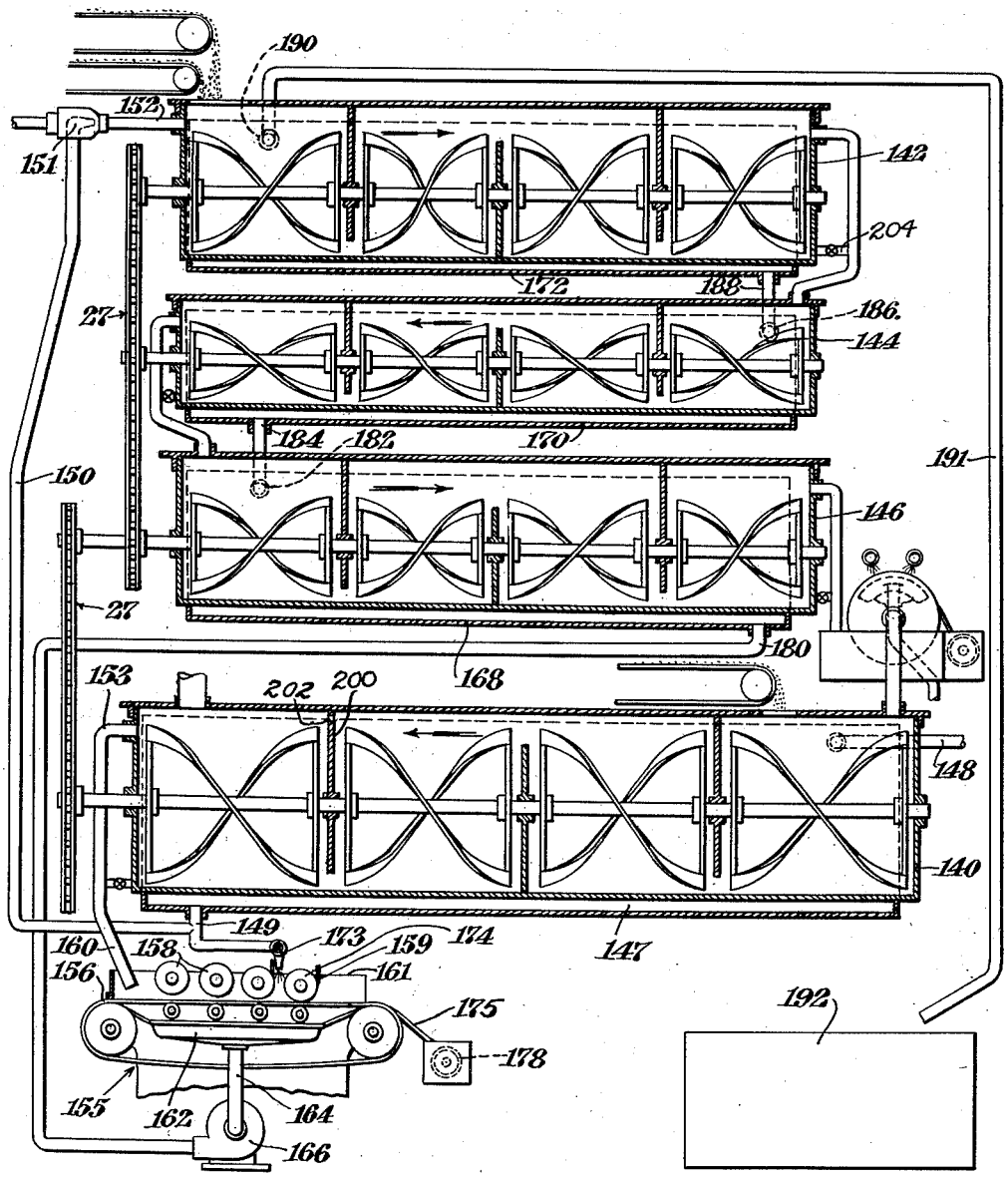

In the drawings:

Fig. 1 represents an arrangement of devices for practising my invention, parts being shown in section to facilitate the disclosure; and Fig. 2 represents a modification wherein the hot wort is used to heat the mash mixers, and also certain details have been changed.

Referring now to the drawings and to Fig. 1, the reference character 10 designates the first mash mixer to which the water, malt, cereals and any other necessary or desired ingredients are added. These ingredients may be added continuously or intermittently but the process is essentially a continuous one. The mixer has a cover or lid 11 which may be secured to the mixer or may rest thereon by gravity. Water is added to the mixer 10 through pipe line 12. The water is preheated in the pre-cooler later to be described. Conveyors 14 and 16 are provided for adding the solid grain or cereal ingredients. The cereals may be brought in a continuous stream on individual conveyors in definite controlled quantities. For instance, malt may be brought on conveyor 14, rice on conveyor 16 and other ingredients on other conveyors. Of course any number of conveyors may be used for the detailed individual method of adding ingredients, or only one conveyor may be needed if the solid dry ingredients are all mixed in a blender (not shown) in the necessary proportions before being added to the mixer 10 by the conveyor. I may also use automatic weighers for adding the cereal ingredients.

The mixer 10 is jacketed on its sides and bottom as at 18 for temperature control and this jacket has inlet pipe 20 at one end of the mixer, and a valved outlet pipe 22 at the end adjacent inlet pipe 12 so that the heating fluid or liquid is hottest where needed. From the outlet pipe 22 the condensate may be used for make-up water for boiler or other purposes. Inlet pipe 20 has a valve 24. Steam or other heating fluid may be used for heating the mixer. As shown in the drawings I use the heating fluid or steam or condensate from the jacket of the hop mixing vessel later to be described. Of course, I may substitute other heating arrangements if desired, or may add additional heating means without digressing from my invention. I may use mixers having no jackets in which case I may use direct fire or naked flame heat or heat radiating elements for temperature control. Or I may impinge a flame directly on the surface in order to obtain desired flavor characteristics. The mixer 10 has a rotatable shaft 26 extending longitudinally therethrough. The shaft 26 is rotated by the sprocket and chain 27 which may be driven by any suitable means. The remaining mixers later described may be driven by means 27 or separate means for each mixer may be used. This shaft 26 has spaced radial brackets 28 to which are attached the spiral ribbons or paddles 30 which function as stirring and mixing devices. These ribbons are pitched in such a way that in addition to thoroughly mixing the ingredients, they also move the liquid mixture gradually in the direction of the arrow toward the discharge opening of the mixer 10. Partitions 32 are provided at intervals to aid in mixing and to prevent the incoming materials from passing to the discharge end without the desired mixing and processing. These partitions are mounted or formed on the mixer 10 and are provided with openings to receive shaft 26 and form bearings therefor. The first partition extends from the top of the mixer to a point near the bottom of the mixer but a space 34 is left at the bottom to permit movement of the mixture. The next partition extends from the bottom of the mixer to a point near the top to leave a space 36 at the top. As many baffles or partitions as desired and any similar arrangement may be employed. It will be noted that the ribbon stirrers 30 are positioned as units in the portions of the mixer 10 between the partitions 32 and the ends of the mixer, and between the partitions 32. I am not to be restricted to the partitions, as in certain cases they may be omitted and continuous ribbon stirrers used.

While I have shown this type of mixer and this type of agitator in the drawings, I do not wish to restrict my invention to these apparatus, as other types of agitators and mixers will function satisfactorily.

Warm water is admitted through valved pipe line 12 at a definite ratio to the cereals added to the mixer 10. After the process has started and has proceeded to the point of cooling the wort, the warm water coming from the cooler 40 (later to be described) can be used as make-up water. Pipe 42 connects pipe line 12 and cooler 40. By utilizing this heat which has been transferred from the boiling wort to the make-up water, a great saving is effected which is not possible in the processes now in use.

As soon as the ingredients reach the mash mixer 10 they are immediately brought into intimate contact with each other by the agitating means or stirring ribbons 30. In this mixer, the mixture is held at around 100 to 125 degrees F. which allows the enzyme peptase to work on the albuminoids and change the insoluble ones into soluble ones. The rate of influx of raw materials is adjusted in relation to the size of the vessel, so as to allow a period of about 45 to 60 minutes for the liquid mixture to reach the discharge end 44 of the mixer 10. In each instance, of course, the cover of the mixer is provided with an opening to permit the introduction of the cereal materials. From the discharge end 44 of mash mixer 10, the mixture flows continuously into mash mixer 50 through pipe 51. As shown in my arrangement the flow is by gravity through the system. This may be changed to use pumps to deliver the liquid from one mixer to the other.

This vessel or mixer 50 is similar to mixer 10 in that it also has a cover and is jacketed and equipped with agitating and stirring means and baffles and a further description of these parts is not believed necessary. It is to be noted, however, that the flow in mixer 50 is in a direction opposite to that in mixer 10 so that the ribbons 30' are so formed as to provide for such directional flow. A valved inlet for steam or other heating fluids is provided at 52 and a valved outlet is provided at 53. The steam or heating liquid is conducted from the supply line 54, leading from the jacket of the hops mixer, later to be described. The pipe 52 enters the jacket at the far end of the mixer at 55. In this vessel or mixer the mixture is kept at around 145 to 160 degrees F., giving the diastase the proper and favorable conditions to work on the starch and change it into sugars and dextrin. About thirty to forty minutes are allowed for this reaction to take place. Hence, this vessel or mixer 50 may be of smaller size than mixer 10.

If it is desired to shorten this reaction period in mixer 50, $CO_2$ gas may be continuously or intermittently bubbled through the liquid mixture and so reduce the pH to about 4.5 to 6.5. In about this range the diastatic power of the malt is greatly increased. The $CO_2$ may be admitted through a perforated pipe or series of pipes 58, which is submerged in the mixture, or through orifices attached to the vessel wall which are connected to an outside supply of $CO_2$. During the fermentation of the wort in the fermenting cellars there is an abundance of $CO_2$ evolved, and it can be economically used for this purpose of increasing the diastatic power of the malt. By the addition of $CO_2$ to the mash, the diastatic power of the malt is greatly increased as well as the peptonization of the albuminoids. The main advantage of using $CO_2$ for this purpose is that after it has completed its work it may be entirely removed by boiling, thereby leaving the wort with its natural flavor and without added foreign substances. While I have shown the $CO_2$ being added to mash mixer 50, I may add it to any of the mashing stages depending entirely upon the results desired.

After the liquid material has been processed or treated in vessel or mixer 50, it flows from the discharge end 60 and through pipe 62 by gravity to mash kettle or mixer 66. This vessel or mixer is also similar to mixer 10, in that it has a cover and is jacketed and equipped with agitating means and baffles. The direction of flow is shown by the arrow in mixer 66 and is the same as in mixer 10. A valved inlet for steam or other heating fluids is provided at 70 and a valved outlet is provided at 72. In the mash mixer 66 the mash is brought to a temperature around 160 to 170 degrees F., at which temperature the starch conversion is completed. The time allowed for this reaction is about 30 minutes to 60 minutes.

The condensate from mixers 10, 50 and 66 may be used for make-up water for the boiler or for other needs. The main advantage of this set-up is that this supply of condensate is continuous as long as the process is in operation, and its heat content can be used up immediately rather than wasting it or attempting to store it for future use. While I have shown it in this manner, I do not wish to restrict myself to this particular set-up, as it may be desirable to connect this exhaust steam or condensate from the hop mixer to only mixer 10 or 50 or 66 or a combination of these, depending upon the individual mashing temperatures used. These temperatures will, of course, determine the size of the individual mash mixers and also the amount of heating fluid necessary to keep these vessels at their respective temperatures.

From the mash mixer 66 the mixture then flows from outlet 76 by gravity to a receptacle or trough 77 of continuous filter 78. I have shown a conventional vacuum filter having a perforated drum 79 provided with a suction member 80 and suction pipe 81. The filtered liquid is drawn into member 80 and drains into discharge pipe 82 leading to the hop mixer or vessel 83. In connection with the filter I have provided sprays 84, a scraper 86 and a conveyor 88. The wort is filtered through the drum 79, the solid matter lying in a thin sheet or layer on the drum while the wort passes through the discharge pipe 82. The thin layer of grain particles on the drum lends itself very nicely to the washing of the sprays 84 of hot water, in this way obtaining almost 100% extraction yield on the grain. The hot water supply for these sprays can be taken from either of the discharge ends of the mixer jackets or from an independent source. If desired, I may use a cloth on the drum to assist in filtering. The washed grains are scraped from the drum or cloth by the scraper 86 and drop into the conveyor casing 87 and are carried away by screw conveyor 88 to the place for disposal. While I have shown a continuous vacuum filter in the drawings, I do not wish to restrict myself to this particular type of equipment, as any other continuous type of filter or even a centrifugal filter may be used for this step.

From the filter 78 the wort flows to a jacketed hop mixer or vessel 83, equipped with agitating means or ribbon mixing devices and baffles similar to vessel or mixer 10. The direction of flow is shown by the arrow. The mixer also has a lid or cover 101 which is preferably tightly secured in place on the mixer by any suitable means. The hops mixer is substantially enclosed so that the loss of valuable volatile oils is minimized. Steam is admitted to the jacket 102 through valved pipe 104. A vent 106 is provided for hops mixer 83. A condenser coil 107 may be used to condense vapors and return them to mixer 83. Hops are added either continuously or intermittently in definite proportions to the flow of wort by means of a conveyor 108 and through opening 109 in cover 101. The hops mixture is immediately brought to a boil and is mixed continuously toward the discharge pipe line 110. The time of boiling is about 45 minutes to 90 minutes.

While I have shown this hops mixer equipped with an agitator for keeping the mixture in a constant state of agitation, I wish to include in my process a simplified hops mixer as follows. Where some operators wish to have a violent boiling of the hops, it is possible to dispense with the agitators, as the violent boiling will cause sufficient agitation of the mixture. The ratio of solids to liquid is so low at this stage of the process that agitation is a relatively simple matter.

The mixture of suspended hops in the wort flows by gravity through the pipe line 110 and through the pre-cooler 40 and thence to a continuous filter 114. By pre-cooling the entire mass I save a large percentage of valuable volatile oils. The pre-cooler 40 has cold water inlet 118 and the outlet 120 which connects with pipe lines 42 and 12 for adding warm or heated water to mixer 10. I have shown the pre-cooler with vertical pipes 121 in order to handle the suspended matter without clogging, although other types of coolers may be used. Pipe line 122 conducts the cooled hop mixture to the continuous suction filter or the like 114 which is similar to filter 78 above described in connection with mixer 66.

In the filter 114 the hops are separated from the clear wort and are efficiently washed or sparged by the sprays of hot water 126. The spent hops are removed by conveyor 130 and carried away for disposal. The clear wort passes through discharge pipe 132 to a final cooler 134 having discharge pipe 135. This cooler may be an enclosed cooler or the usual open Baudelot type. The cooler has inlet pipe 136 and outlet pipe 137 for the cooling medium. Here the wort is cooled to about 40 degrees F. and is then ready for the yeast and fermenting cellar. I have shown a vacuum filter in this set-up for filtering the wort, and therefore I have inserted the pre-cooler 40. In Figure 2 I have shown an arrangement which does not require a pre-cooler.

In Figure 2 I have shown a modified arrangement where the boiling wort from the hops mixer 140 is filtered directly and without pre-cooling and then used as a heating medium for mash mixers 142, 144 and 146 for counter-current flow so that the hottest liquid is used in the hottest mash mixer. In this set-up the mashing operations and the boiling in the hops mixer are the same as given in the description in Figure 1. The main difference is in the utilization of the heat in the boiled wort. The hops mixer 140 is jacketed at 147 and has inlet means 148 for heating fluid and an outlet 149. The outlet 149 is connected with pipe 150 and injector 151 for heating water fed into pipe 152 for first mash mixer 142. The boiling mixture leaves the hops mixer at discharge 153 and flows to continuous filter 155. The filter is a conventional one and comprises an endless perforated belt or screen conveyor 156 which carries the material to be filtered between two sets of pressure rollers 158. Scrapers 159 are provided. The wort flows through pipe 160 into tank 161. The liquid is held back by the rolls and the wort seeps through the material on the screen conveyor 156 and collects in collecting receptacle 162. From here it passes through pipe 164 to pump 166 which pumps the hot wort through the jackets 168, 170 and 172 of the mash mixers 146, 144 and 142 respectively. The hops which are held by the screen conveyor 156 pass underneath the rollers 158, are sprayed with hot water from spray 173, pass under end roller 174, and are then removed from the screen conveyor 156 by scraper 175 or other means such as air blasts (not shown), and then are removed by screw conveyor 178 as waste. Spray 173 is connected with outlet 149 from the jacket of mixer 140. The hot wort is shown entering the jacket 168 of mash mixer 146 entering at 180 and leaving at 182; it then enters jacket 170 of mash mixer 144 at 184 and leaves it at 186, and then enters jacket 172 of mash mixer 142 at 188 and leaves it at 190. By this time the wort has given up considerable heat and is now ready for final cooler 192 which may be an open or closed cooler of the type described in connection with Figure 1. Pipe 191 connects outlet 190 and cooler 192. Here it is cooled to around 40 degrees F. and is then ready for fermenting cellars. The cooled wort is discharged into collector 194 and from here is pumped to the cellars by pump 196. Sprockets and chains 27 for driving the stirrers are used for the mixers in Figure 2 which are similar to those shown in Figure 1 but separate and individual means may be used for each mixer if desired.

If necessary partition 198 in hops mixer 83 (Figure 1) and partition 200 in hops mixer 140 (Figure 2) may have a small opening 202 therein near the covers of the hops mixers to prevent trapping of vapor.

At the end of the process in order to drain the contents of the mixers I have provided valved outlets 204. In some instances it is preferable to add drain openings for cleaning purposes.

The jackets for the mixers shown in Figures 1 and 2 may have large cover plates to facilitate in cleaning the apparatus. If desired, stainless steels or metals or copper may be used for the apparatus shown.

By using my continuous process, thinner concentrations are possible than now are used, and in this way better extraction yields are obtained. Also with thinner mashes the rate of diastatic activity is higher than with a thicker mash. Other advantages and objects of my continuous process and apparatus have been above set forth.

What I claim is:

1. A process for the continuous production of beer wort, which comprises feeding water, malt, and cereals or the like, substantially continuously to a jacketed mash mixer where the materials fed in are mixed, discharging the mixture continuously, continuously filtering the solid materials from the liquid, running the liquid to a hops mixer where hops are added, boiling this mixture, discharging the hopped mixture, filtering off the hops without pre-cooling and then using the hot wort as a heating medium to be circulated thru the jackets of the mash mixer in counter-current flow whereby the wort is cooled.

2. A process for the continuous production of wort, which comprises continuously mixing water, cereals or the like at proper mashing temperatures, continuously filtering the solid materials and solids from the liquid, adding hops to the liquid, boiling the hopped mixture, filtering off the hops, using the hot wort as a heating means for maintaining the mashing temperatures whereby the wort is cooled and then further cooling the wort.

3. A process for the continuous production of a beer wort, which comprises, adding water, malt and cereals to a mixer, mixing the ingredients at a proper mashing temperature while advancing the mixture along in the mixer, continuously discharging a portion of the mixture, continuously filtering the mixture as it leaves the mixer, adding hops to the filtrate in a second mixer, boiling the mixture while moving it along, continuously discharging a portion of the hopped mixture and continuously filtering the mixture as it leaves the second mixer to remove hops and solid materials.

4. An apparatus of the character described, including, in combination, a jacketed mash mixing means, a jacketed hops mixer, means for conducting steam or heating fluid to the jacket of said hops mixer adjacent one end thereof to heat the contents thereof, and means connected adjacent one end of the jacket of said hops mixer and communicating with the jacket of said mash mixing means whereby the steam or heating fluid leaving the jacket of the hops mixer is used to heat up the mash mixing means.

5. A process for the continuous production of a substantially uniform beer wort, which comprises feeding water and cereal material containing malt substantially continuously into one end of a mash mixer, mixing the cereal material and water and moving the mixture toward the discharge end of the mash mixer, continuously discharging some of the mashed mixture from the mash mixer, filtering such discharged mixture substantially continuously as it is being discharged from the mash mixer, conducting the filtrate to one end of a hops mixer, adding hops to the filtrate substantially continuously, boiling the hopped mixture and moving it toward the discharge end of the hops mixer, discharging some of the hopped mixture substantially continuously from the hops mixer, and filtering the hops from such hopped mixture substantially continuously as it is being discharged from the hops mixer to obtain a beer wort.

6. A method of continuously producing wort which comprises mixing and mashing water and cereal material containing malt, moving such mixture along through a peptonizing and saccharifying zone while continuing the mixing, discharging a small amount of the mashed mixture from such zone continuously, immediately and continuously separating the discharged mashed mixture, while it is being discharged, into two portions, one portion being the suspended material which is discharged to waste and the other portion being the malt extract, continuing the movement of the malt extract and continuously adding a small amount of hops to the malt extract near one end of a cooking zone, moving the hopped mixture along through such cooking zone, discharging a small amount of the hopped mixture continuously from such cooking zone, immediately and continuously separating such discharged, hopped mixture, while it is being discharged, into two portions, one portion being the suspended material which is discharged to waste and the other portion being the clear, hot wort.

7. A method of continuously producing wort which comprises mixing and mashing water and cereal material containing malt, moving such mixture along through a peptonizing and saccharifying zone and bubbling $CO_2$ gas through the mixture while continuing the mashing, discharging a small amount of the mashed mixture from such zone continuously, immediately and continuously separating the discharged mashed mixture, while it is being discharged, into two portions, one portion being the suspended material which is discharged to waste continuously and the other portion being the malt extract, continuing the movement of the malt extract and continuously adding hops to the malt extract at one end of a cooking zone, moving the hopped mixture along through such cooking zone, discharging a small amount of the hopped mixture continuously from such cooking zone, and immediately and continuously separating such discharged, hopped mixture, while it is being discharged, into two portions, one portion being the suspended material which is discharged to waste continuously and the other portion being the clear, hot wort.

8. A method of continuously producing wort which comprises mixing and mashing water and cereal material containing malt, moving such mixture along through a peptonization and saccharification zone and bubbling $CO_2$ gas through the mixture while mashing to increase the diastatic action of the malt, discharging a portion of the mashed mixture from such zone continuously, filtering such mashed mixture as it is discharged from such zone and continuing the movement of the filtered liquid, adding hops to the filtered mixture while it is being moved along, moving the hopped mixture along through a cooking zone while stirring the mixture, discharging a portion of the hopped mixture from such cooking zone continuously, and filtering such hopped mixture as it is discharged from such cooking zone to produce a substantially clear wort.

9. A method of continuously producing wort which comprises mixing and mashing water and cereal material containing malt, moving such mixture along through a jacketed mash mixer comprising a peptonization and saccharification zone while continuing the mixing, discharging a portion of the mashed mixture from said zone continuously, filtering such discharged portion of the mashed mixture as it is being discharged from such zone and continuing the movement of the filtered liquid, adding hops to the filtered liquid while it is being moved along, moving the hopped mixture along through a cooking zone while stirring the mixture, discharging a portion of the hopped mixture from such cooking zone continuously, filtering such discharged portion of the hopped mixture as it is being discharged from such cooking zone to produce a clear, hot wort, and immediately conducting the hot wort into the jacket of the jacketed mash mixer to heat the mash mixture to the peptonizing and saccharifying temperatures.

10. A method of continuously producing wort which comprises mixing and mashing water and cereal material containing malt, moving such mixture along through a peptonizing and saccharifying zone while continuing the mixing, discharging a small amount of the mashed mixture from such zone continuously, immediately and continuously separating the discharged mashed mixture into two portions while being discharged, one portion being the suspended material which is discharged to waste and the other portion being the malt extract, continuing the movement of the malt extract and continuously adding a small amount of hops to the malt extract near one end of a cooking zone, moving the hopped mixture along through such cooking zone, discharging a small amount of the hopped mixture continuously from such cooking zone, cooling such discharged hopped mixture and then immediately and continuously separating such discharged and cooled hopped mixture while being discharged into two portions, one portion being the hops and insoluble material which is discharged to waste and the other portion being the wort.

11. A process for the continuous production of a wort, which comprises adding water and malt to a mixer, mixing the ingredients at a proper mashing temperature while advancing the mixture along in the mixer, continuously discharging a portion of the mixture, continuously filtering the mixture as it leaves the mixer, adding hops to the filtrate in a second mixer, boiling the hopped mixture while moving it along, continuously discharging a portion of the hopped mixture from said second mixer, cooling the discharged hopped mixture and continuously filtering the cooled hopped mixture to remove hops and insoluble material from wort.

JOHN F. SILHAVY.